(12) United States Patent
Karasawa

(10) Patent No.: US 11,942,289 B2
(45) Date of Patent: Mar. 26, 2024

(54) VACUUM INTERRUPTER AND VACUUM BREAKER

(71) Applicant: MEIDENSHA CORPORATION, Tokyo (JP)

(72) Inventor: Yasuo Karasawa, Yaizu (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 18/011,006

(22) PCT Filed: Jun. 4, 2021

(86) PCT No.: PCT/JP2021/022225
§ 371 (c)(1),
(2) Date: Dec. 16, 2022

(87) PCT Pub. No.: WO2021/256387
PCT Pub. Date: Dec. 23, 2021

(65) Prior Publication Data
US 2023/0238201 A1    Jul. 27, 2023

(30) Foreign Application Priority Data
Jun. 18, 2020  (JP) ................ 2020-104931

(51) Int. Cl.
*H01H 33/56*    (2006.01)
*H01H 33/662*   (2006.01)
*H01H 33/666*   (2006.01)

(52) U.S. Cl.
CPC ...... *H01H 33/66207* (2013.01); *H01H 33/56* (2013.01); *H01H 33/66238* (2013.01); *H01H 33/666* (2013.01); *H01H 2033/66223* (2013.01)

(58) Field of Classification Search
CPC ............ H01H 33/66207; H01H 33/56; H01H 33/66238; H01H 33/666; H01H 2033/66223; H02B 13/035
(Continued)

(56) References Cited

U.S. PATENT DOCUMENTS 4,394,554 A * 7/1983 Warabi ............. H01H 33/66207
218/136
4,962,289 A * 10/1990 Stegmuller ...... H01H 33/66238
218/135
(Continued)

FOREIGN PATENT DOCUMENTS

DE    88 10 063 U1    9/1988
EP    0 352 611 A2    1/1990
(Continued)

OTHER PUBLICATIONS

Search report in EP Application No. 21825149.4 dated Nov. 8, 2023 (8 pgs.).

*Primary Examiner* — William A Bolton
(74) *Attorney, Agent, or Firm* — Foley & Lardner LLP

(57) ABSTRACT

In a vacuum container (1) of a vacuum interrupter (1A), an insulating cylindrical body (10) is sealed with a fixed-side flange (11*a*) on the fixed side in the axial direction, and is sealed with a movable-side flange (11*b*) on the movable side in the axial direction. In the fixed-side flange (11*a*) and the movable-side flange (11*b*), annular expansion portions (5*a*, 5*b*) are formed between middle portions (3*a*, 3*b*) and outer peripheral edge portions (4*a*, 4*b*), respectively. The annular expansion portions (5*a*, 5*b*) are respectively formed in annular shapes extending along the outer peripheries of the middle portions (3*a*, 3*b*), and in shapes expanding in the axial outer side direction of the vacuum container (1), such that an arch structural effect can be obtained.

4 Claims, 7 Drawing Sheets

(58) Field of Classification Search
USPC .................. 218/118, 134, 136, 139, 147
See application file for complete search history.

(56) References Cited

U.S. PATENT DOCUMENTS

| | | | |
|---|---|---|---|
| 4,983,793 | A | 1/1991 | Stegmuller |
| 5,222,651 | A * | 6/1993 | Pilsinger .......... H01H 33/66207 228/221 |
| 7,781,694 | B2 * | 8/2010 | Stoving .............. H01H 33/6645 218/136 |
| 8,178,812 | B2 * | 5/2012 | Martin .............. H01H 33/66207 218/139 |
| 9,281,145 | B2 * | 3/2016 | Wang ............... H01H 33/66261 |
| 9,972,466 | B2 * | 5/2018 | Ryu ...................... H01H 33/664 |
| 2007/0007250 | A1 * | 1/2007 | Li ..................... H01H 33/66207 218/134 |
| 2011/0084117 | A1 | 4/2011 | Schellekens et al. |
| 2018/0005784 | A1 | 1/2018 | Nagatake et al. |

FOREIGN PATENT DOCUMENTS

| | | |
|---|---|---|
| JP | S49-131567 U | 3/1973 |
| JP | S5266960 A | 6/1977 |
| JP | H02-082418 A | 3/1990 |
| JP | 2004-259633 A | 9/2004 |
| JP | 5255416 B2 | 8/2013 |
| JP | 2016-126952 A | 7/2016 |
| KR | 20180121078 A | 11/2018 |

* cited by examiner

VACUUM INTERRUPTER AND VACUUM BREAKER

TECHNICAL FIELD

The present invention relates to a vacuum breaker applied to, for example, various power facilities, and to a vacuum interrupter which can be applied to the vacuum breaker.

BACKGROUND TECHNOLOGY

As a vacuum breaker applied to, for example, a power facility, one incorporating a vacuum interrupter as a current breaking unit has been known. Recently, it has been expected that these vacuum breaker and vacuum interrupter are applied to high-voltage power system wider, and various improvement has been considered in order to obtain a desired characteristic (for example, insulation performance) (for example, patent documents 1 and 2).

A numeral "9" in FIG. 6 indicates one example of a commonly known vacuum interrupter, and a vacuum container 91 is used in which a fixed side that is one end side in the axial direction of an insulating cylindrical body 90 (hereinafter is simply referred to as "axial direction") is sealed with a fixed-side flange 91a (in the drawing, an outer peripheral edge portion 96a is sealed while being supported on an end surface 9aa) and a movable side that is the other end side in the axial direction is sealed with a movable-side flange 91b (in the drawing, an outer peripheral edge portion 96b is sealed while being supported on an end surface 9bb).

The cylindrical body 90 is one including a middle shield (arc shield) 9c, a fixed-side insulating portion 9a and a movable-side insulating portion 9b each having a cylindrical shape, and has structure in which the middle shield 9c is sandwiched between the fixed-side insulating portion 9a and the movable-side insulating portion 9b so as to be coaxially arranged.

A fixed-side energizing shaft 92a is provided to a middle portion 94a of the fixed-side flange 91a so as to extend toward the vacuum container 91 inner side in the axial direction, and a fixed electrode 93a is supported on an end portion of the fixed-side energizing shaft 92a. The movable-side flange 91b is provided with a movable-side energizing shaft 92b extending in the axial direction so as to pass through a middle portion 94b of the movable-side flange 91b in the axial direction.

The movable-side energizing shaft 92b is supported on the vacuum container 91 inner side of the movable-side flange 91b via a bellows 92c which is extensible in the axial direction, so as to be movable in the axial direction. A movable electrode 93b is supported on an end portion of the movable-side energizing shaft 92b so as to come in contact with and separate from the fixed electrode 93a according to the movement of the movable-side energizing shaft 92b.

In the vacuum interrupter 9, it has been known that, in addition to the middle shield 9c, various shields which are referred to as sub shields are appropriately disposed in order to improve electric field characteristics (for example, in order to reduce an electric field value of the end portion of each of the shields). As one example thereof, it can be cited to dispose electric field relaxation shields 95a and 95b and a bellows shield 95c as illustrated.

The vacuum interrupter 9 as mentioned above is applied by being accommodated in a sealed container (for example, at least one vacuum interrupter 9 is accommodated in a grounding tank of a vacuum breaker) in which, for example, an insulation medium gas is sealed, so as to exhibit desired characteristics (such as insulation performance and breaking performance) by appropriately operating the movable-side energizing shaft 92b (by appropriately operating the movable-side energizing shaft 92b so as to move in the axial direction).

PRIOR ART REFERENCE(S)

Patent Document(s)

Patent Document 1: Japanese Patent Application Publication No. 2004-259633
Patent Document 2: Japanese Patent No. 5255416

SUMMARY OF THE INVENTION

If, as mentioned above, the vacuum interrupter 9 is arranged inside a sealed container in which an insulation medium gas is sealed, external pressure generated by the pressure difference between the inside of the vacuum container 91 and the insulation medium gas acts on the vacuum container 91. Consequently, when the external pressure becomes high, there is a possibility that, in particular, deformation or damage occurs to a part of the vacuum container 91 where mechanical strength is low, and it can be considered that a desired characteristic of the vacuum interrupter 9 cannot be exhibited.

As one example of means for withstanding such external pressure, by increasing the thickness of the peripheral wall of the vacuum container 91 or by providing a reinforcing member, the mechanical strength of the vacuum container 91 is improved. However, when such means is simply applied, there is a possibility that the cost or size of the vacuum interrupter 9 increases.

The present invention has been made in a consideration of such a technical problem, and an object of the present invention is to provide a technique for improving mechanical strength against external pressure in a vacuum container of a vacuum interrupter.

A vacuum interrupter and a vacuum breaker according to the present invention are ones capable of contributing to solving the above problem, and the vacuum interrupter, in one aspect thereof, includes: a vacuum container including an insulating cylindrical body, the vacuum container being sealed with a fixed-side flange on a fixed side thereof which is one end side in an axial direction of the cylindrical body, and being sealed with a movable-side flange on a movable side thereof which is an other end side in the axial direction; a fixed-side energizing shaft extending in a vacuum container inner side direction of the axial direction, in a fixed-side flange middle portion; a fixed electrode supported on an end portion on an extending direction side of the fixed-side energizing shaft; a movable-side energizing shaft which extends in the axial direction while passing through a movable-side flange middle portion in the axial direction, and is supported on a vacuum container inner side of the movable-side flange via a bellows which is extensible in the axial direction, so as to be movable in the axial direction; and a movable electrode which is supported on an end portion on the vacuum container inner side of the movable-side energizing shaft so as to face the fixed electrode, and comes in contact with and separates from the fixed electrode in accordance with a movement of the movable-side energizing shaft. Then, the fixed-side flange is formed with an annular expansion portion between the flange middle portion and a flange outer peripheral edge portion of the fixed-side flange and the movable-side flange is formed with an annular expansion portion between the flange middle portion and a flange outer peripheral edge portion of the movable-side flange, and each of the annular expansion portions is formed in an annular shape extending along an outer periphery of a corresponding one of the flange middle portions, and is formed in a shape expanding in an vacuum container outer side direction of the axial direction.

In the one aspect, each of the expansion portions includes: an inner peripheral side annular wall which is positioned from a corresponding one of distal end portions in an expanding direction of a corresponding one of the expansion portions toward a corresponding one of the flange middle portions, and has a shape of which a diameter increases as it goes in the expanding direction; and an outer peripheral side annular wall which is positioned from a corresponding one of the distal end portions in the expanding direction of a corresponding one of the expansion portions toward a corresponding one of the flange outer peripheral edge portions, and has a shape of which a diameter decreases as it goes in the expanding direction.

In addition, an interior angle θ of each of the expansion portions between a corresponding one of the inner peripheral side annular walls and a corresponding one of the outer peripheral side annular walls is in a range of 90°-150°. In addition, when a diameter of each of the distal end portions in the expanding direction is referred to as L1 and a diameter of each of the flange outer peripheral edge portions is referred to as L, a relationship therebetween satisfies a relational expression of $0.5L \leq L1 \leq 0.7L$.

One aspect of the vacuum breaker is one provided with at least one vacuum interrupter mentioned above, including: a sealed container which accommodates the vacuum interrupter, and is filled with an insulation medium gas inside thereof; a link mechanism which is disposed inside the sealed container, and is configured to electrically connect the movable-side energizing shaft of the vacuum interrupter so as to be movable in the axial direction; and an operation part which is disposed on an outer peripheral side of the sealed container, and is configured to operate the link mechanism via an insulation operation rod connected to the link mechanism.

As the above, according to the present invention, it is possible to easily improve mechanical strength against external pressure in the vacuum container of the vacuum interrupter.

MODE FOR IMPLEMENTING THE INVENTION

Figure 6:
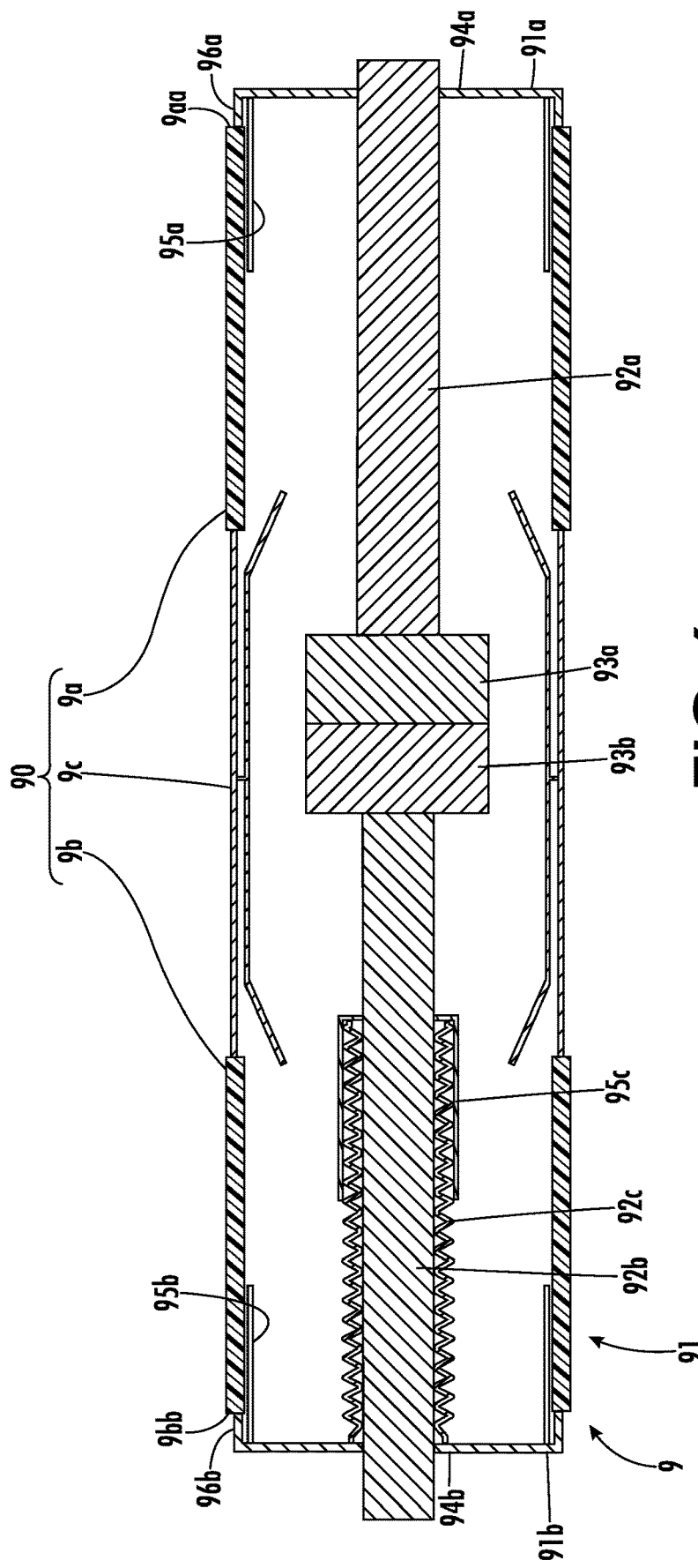
FIG. 6 is a schematic diagram for explaining one example of a commonly known vacuum interrupter (sectional view in the axial direction (in the right and left direction in the drawing) of a vacuum container 91).

A vacuum interrupter and a vacuum breaker provided with the vacuum interrupter according to an embodiment of the present invention are each totally different from one in which the thickness of the peripheral wall of a vacuum container is simply increased or a reinforcing member is simply provided, in a configuration shown in, for example, FIG. 6.

That is, in the vacuum interrupter and the vacuum breaker according to the present embodiment, in a fixed-side flange, an annular expansion portion is formed between a flange middle portion and a flange outer peripheral edge portion of the fixed-side flange, and has an annular shape extending along the outer periphery of the flange middle portion, and has a shape expanding in the axial outer side direction of the vacuum container, and, in a movable-side flange, an annular expansion portion is formed between a flange middle portion and a flange outer peripheral edge portion of the movable-side flange, and has an annular shape extending along the outer periphery of the flange middle portion, and has a shape expanding in the axial outer side direction of the vacuum container.

Figure 7B:
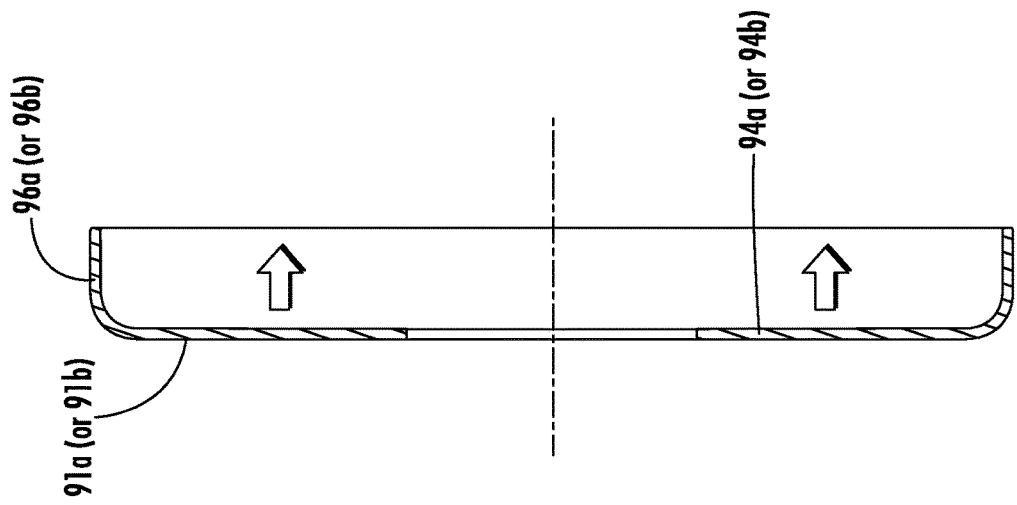
FIGS. 7(A) and 7(B) are schematic diagrams for explaining external pressure which acts on the commonly known vacuum interrupter (FIG. 7(A) is an external view, and FIG. 7(B) is a sectional view in the axial direction of a fixed-side flange 91a (or a movable-side flange 91b)).
Figure 7A:
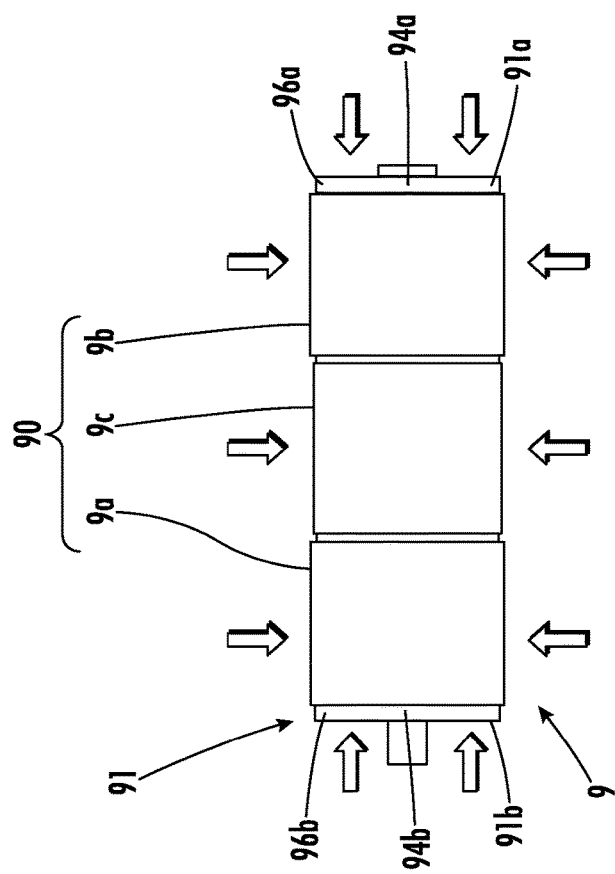

Here, when focusing on a case where a vacuum interrupter 9 shown in FIG. 6 is arranged inside a sealed container filled with an insulation medium gas, as shown in outline arrows in FIG. 7(A), due to the pressure difference between the inside of a vacuum container 91 and the insulation medium gas, external pressure acts on the vacuum interrupter 91.

In this case, in a cylindrical body 90, a dynamic effect (hereinafter is simply referred to as an arch structural effect) by convex arch structure against the acting direction of the external pressure can be obtained, and the external pressure is easily dispersed in the circumferential direction of the cylindrical body 90.

However, in a fixed-side flange 91a, as shown in FIG. 7(B), the part between a flange middle portion 94a and a flange outer peripheral edge portion 96a and the part between a flange middle portion 94b and a flange peripheral edge portion 96b are flat, and the above arch structural effect cannot be obtained. Consequently, when the mechanical strength of the fixed-side flange 91a is low, for example, the parts having the flat structure are easily deformed in the direction shown by black arrows in FIG. 7(B). Such a phenomenon also occurs to the movable-side flange 91b at the same time.

On the other hand, in the fixed-side flange and the movable-side flange in the present embodiment, as compared with the configuration shown in FIG. 6, by the annular expansion portions formed between the flange middle portions and the flange outer peripheral edge portions respectively, the arch structural effect can be easily obtained.

That is, in the vacuum container of the vacuum interrupter in the present embodiment, as compared with the configuration shown in FIG. 6, mechanical strength against external pressure can be easily improved. Then, the vacuum interrupter contributes to exhibit desired characteristics (such as insulation performance and breaking performance).

In the present embodiment, as mentioned above, the annular expansion portions are formed at the respective fixed-side flange and movable-side flange, and it is sufficient to have a configuration which is capable of obtaining the arch structural effect, and design change is possible by appropriately applying common general knowledge of various fields (such as a vacuum breaker field) while appropriately referring to prior art references as needed. As one example thereof, an embodiment shown in the following can be cited.

In addition, in the following embodiment, for convenience, the vacuum container inner side direction of the axial direction is simply referred to as an axial inner side direction, and the vacuum container outer side direction of the axial direction is simply referred to as an axial outer side direction (expansion directions of annular expansion portions).

EMBODIMENT

<Configuration Example of Vacuum Interrupter>

Figure 1:
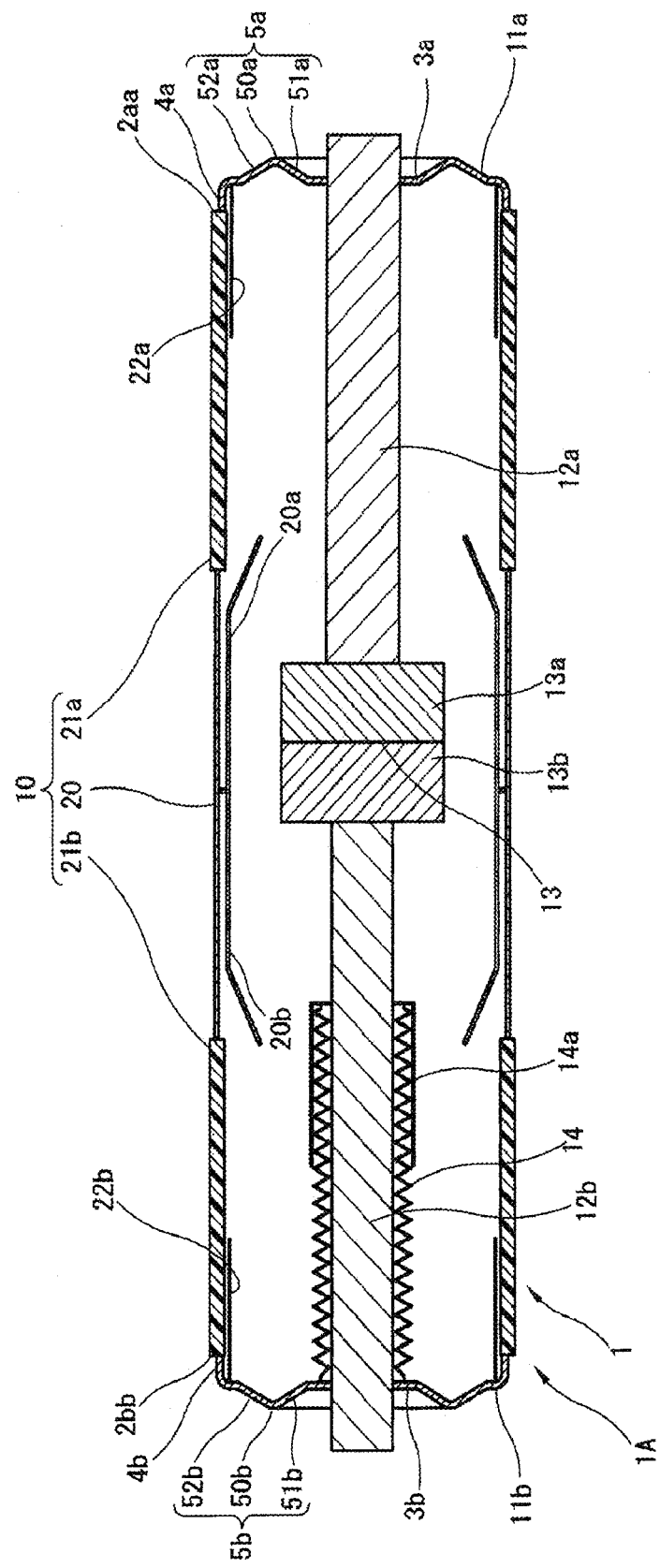
FIG. 1 is a schematic diagram for explaining a schematic configuration of a vacuum interrupter 1A (1B) in an embodiment (sectional view in the axial direction of a vacuum container 1 (in the right and left direction in the drawing)).

FIG. 1 is a drawing for explaining the schematic configuration of a vacuum interrupter 1A that is an embodiment of the present invention. In the vacuum interrupter 1A, a vacuum container 1 is used in which the fixed side in the axial direction of an insulating cylindrical body 10 is sealed with a fixed-side flange 11a, and the movable side in the axial direction of the insulating cylindrical body 10 is sealed with a movable-side flange 11b.

The cylindrical body 10 is provided with, as main components, a cylindrical middle shield (arc shield) 20 surrounding the outer peripheral sides of the after-mentioned fixed electrode 13a and movable electrode 13b, a fixed-side insulating portion 21a connected with the fixed side in the axial direction of the middle shield 20, and a movable-side insulating portion 21b connected with the movable side in the axial direction of the middle shield 20.

The middle shield 20 is provided with, in the middle part thereof, a fixed-side extending portion 20a which extends from the middle part toward the fixed side in the axial direction and is superimposed with the inner peripheral side of the fixed-side insulating portion 21a, and a movable-side extending portion 20b which extends from the middle part toward the movable side in the axial direction and is superimposed with the inner peripheral side of the movable-side insulating portion 21b.

A middle portion 3a of the fixed-side flange 11a is provided with a columnar fixed-side energizing shaft 12a extending from the middle portion 3a in the axial inner side direction. A fixed electrode 13a having, for example, a flat plate shape is supported on an end portion in the axial inner side direction of the fixed-side energizing shaft 12a. An outer peripheral edge portion 4a of the fixed-side flange 11a has a shape bent in the axial inner side direction, and is supported on an end surface 2aa of the fixed-side insulating portion 21a.

An annular expansion portion 5a which is formed in an annular shape extending along the outer periphery of the middle portion 3a, and has a shape expanding in the axial outer side direction is formed between the middle portion 3a and the outer peripheral edge portion 4a of the fixed-side flange 11a. The annular expansion portion 5a in FIG. 1 includes an inner peripheral side annular wall 51a which is positioned from a distal end portion 50a in the expansion direction of the annular expansion portion 5a toward the middle portion 3a side, and has a shape of which the diameter increases as it goes in the expansion direction, and an outer peripheral side annular wall 52a which is positioned from the distal end portion 50a toward the outer peripheral edge portion 4a side, and has a shape of which the diameter decreases as it goes in the expansion direction.

In addition, on the outer peripheral edge portion 4a side of the fixed-side flange 11a, a cylindrical fixed-side electric field relaxation shield 22a extending from the outer peripheral edge portion 4a side in the axial inner side direction is provided so as to surround the outer peripheral side of the fixed-side energizing shaft 12a.

The movable-side flange 11b is provided with a columnar movable-side energizing shaft 12b which extends in the axial direction while passing through the movable-side flange 11b in the axial direction. The movable-side energizing shaft 12b is supported on the vacuum container 1 inner side of the movable-side flange 11b via a cylindrical bellows 14 which is extensible in the axial direction and is arranged coaxially with the movable-side energizing shaft 12b.

Accordingly, the movable-side energizing shaft 12b is movable in the axial direction. The movable-side energizing shaft 12b in FIG. 1 is provided with a cylindrical bellows shield 14a so as to surround and cover the outer peripheral side of the bellows 14.

In addition, a movable electrode 13b having, for example, a flat plate shape is supported on an end portion on the vacuum container 1 inner side of the movable-side energizing shaft 12b, and is configured to come into contact with and separate from the fixed electrode 13a in accordance with the movement in the axial direction of the movable-side energizing shaft 12b. An outer peripheral edge portion 4b of the movable-side flange 11b has a shape bent in the axial inner side direction, and is supported on an end surface 2bb of the movable-side insulating portion 21b.

An annular expansion portion 5b which is formed in an annular shape extending along the outer periphery of a middle portion 3b of the movable-side flange 11b, and has a shape expanding in the axial outer side direction is formed between the middle portion 3b and an outer peripheral edge portion 4b of the movable-side flange 11b. The annular expansion portion 5b in FIG. 1 includes an inner peripheral side annular wall 51b which is positioned from a distal end portion 50b in the expansion direction of the annular expansion portion 5b toward the middle portion 3b side, and has a shape of which the diameter increases as it goes in the expansion direction, and an outer peripheral side annular wall 52b which is positioned from the distal end portion 50b toward the outer peripheral edge portion 4b side, and has a shape of which the diameter decreases as it goes in the expansion direction.

In addition, on the outer peripheral edge portion 4b side of the movable-side flange 11b, a cylindrical movable-side electric field relaxation shield 22b extending from the outer peripheral edge portion 4b side in the axial inner side direction is provided so as to surround the outer peripheral side of the movable-side energizing shaft 12b.

According to the vacuum interrupter 1A shown in FIG. 1, by the annular expansion portion 5a of the fixed-side flange 11a and the annular expansion portion 5b of the movable-side flange 11b, an arch structural effect can be obtained, and mechanical strength against external pressure is easily enhanced.

<Configuration Example of Fixed-Side Flange 11a and Movable-Side Flange 11b>

As mentioned above, if each of the fixed-side flange 11a and the movable-side flange 11b formed with the annular expansion portions 5a and 5b respectively is one which is capable of obtaining an arch structural effect, various modes can be applied, and, for example, one formed by appropriately using a material applied to a common metal flange can be cited.

Figure 2:
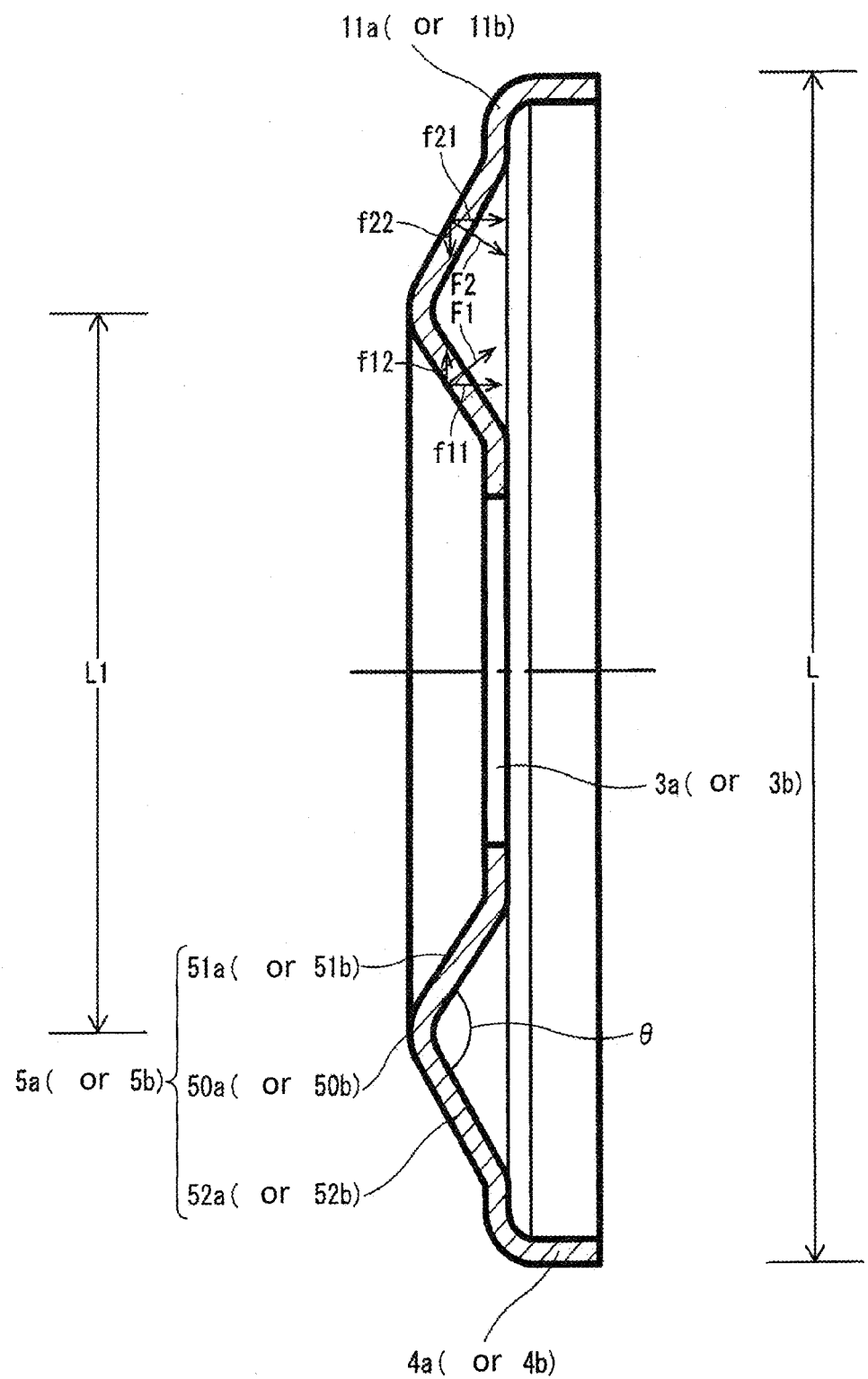
FIG. 2 is a schematic diagram (sectional view in the axial direction) for explaining a schematic configuration of a fixed-side flange 11a (or a movable-side flange 11b).

As a specific example, although the fixed-side flange 11a and the movable-side flange 11b shown in FIG. 2 can be cited, it is not limited to those, and design modification can also be performed. For example, the middle portions 3a and 3b can be appropriately designed according to a shape or the like of the fixed-side extending portion 20a and the movable-side insulating portion 21b.

For example, the shape of each of the annular expansion portions 5a and 5b can also be appropriately designed in consideration of the whole shape of each of the fixed-side flange 11a and the movable-side flange 11b, so as to obtain an arch structural effect.

Specifically, an interior angle θ between the inner peripheral side annular wall 51a and the outer peripheral side annular wall 52a and an interior angle θ between the inner peripheral side annular wall 51b and the outer peripheral side annular wall 52b are each designed so as to be in the range of 90°-150°. If each of these interior angles θ is too large (for example, over 150°), it can be considered that an arch structural effect is hardly obtained. On the other hand, if each of these interior angles θ is too small (for example, smaller than 90°), it might have an influence on electric characteristics (such as an influence on an electric field characteristic). However, in this case, each of the fixed-side flange 11a and the movable-side flange 11b is designed so as to suppress the influence (for example, various sub-shields are disposed).

In addition, a diameter L1 of each of the distal end portions 50a and 50b is set to be approximately 60% of a diameter L of each of the outer peripheral edge portions 4a and 4b (namely, L1/L=0.6). Further, if the following formula is satisfied, it can be considered that a sufficient arch structural effect can be obtained.

$$0.5L \leq L1 \leq 0.7L$$

According to the configuration shown in FIG. 2, a load F1 applied to the inner peripheral side annular wall 51a or 51b by external pressure is dispersed to a component f11 in the axial inner side direction and a component f12 in the direction on the outer peripheral edge portion 4a or 4b side. That is, the component f12 of the load F1 is supported by the outer peripheral side annular wall 52a or 52b, thereby easily withstanding the load F1.

Similarly, a load F2 applied to the outer peripheral annular wall 52a or 52b by external pressure is dispersed to a component f21 in the axial inner side direction and a component f22 in the direction of the middle portion 3a or 3b side. That is, the component f22 of the load F2 is supported by the inner peripheral side annular wall 51a or 51b, thereby easily withstanding the load F2.

<One Example of Structural Analysis>

Figure 3A:
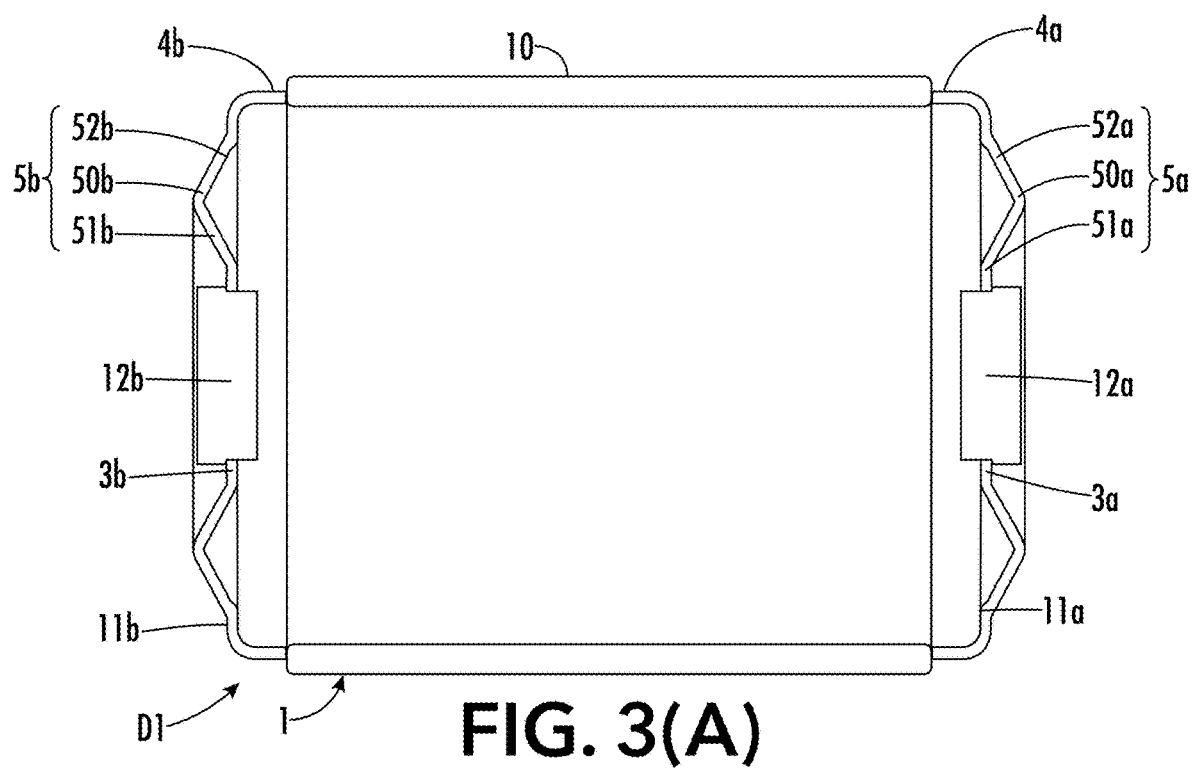
FIGS. 3(A) and 3(B) show configuration diagrams of three-dimensional analytic models D1 and D2 when vacuum interrupters 1A and 9 are each simplified into a half-size symmetrical model.
Figure 3B:
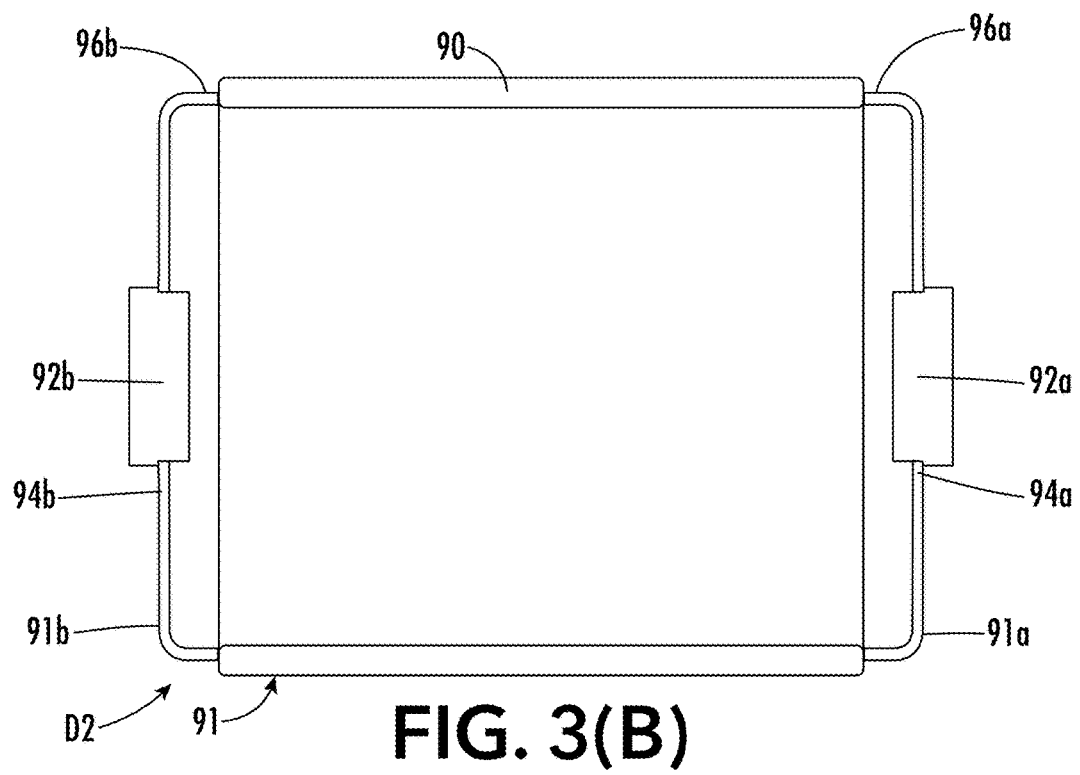
Figure 4A:
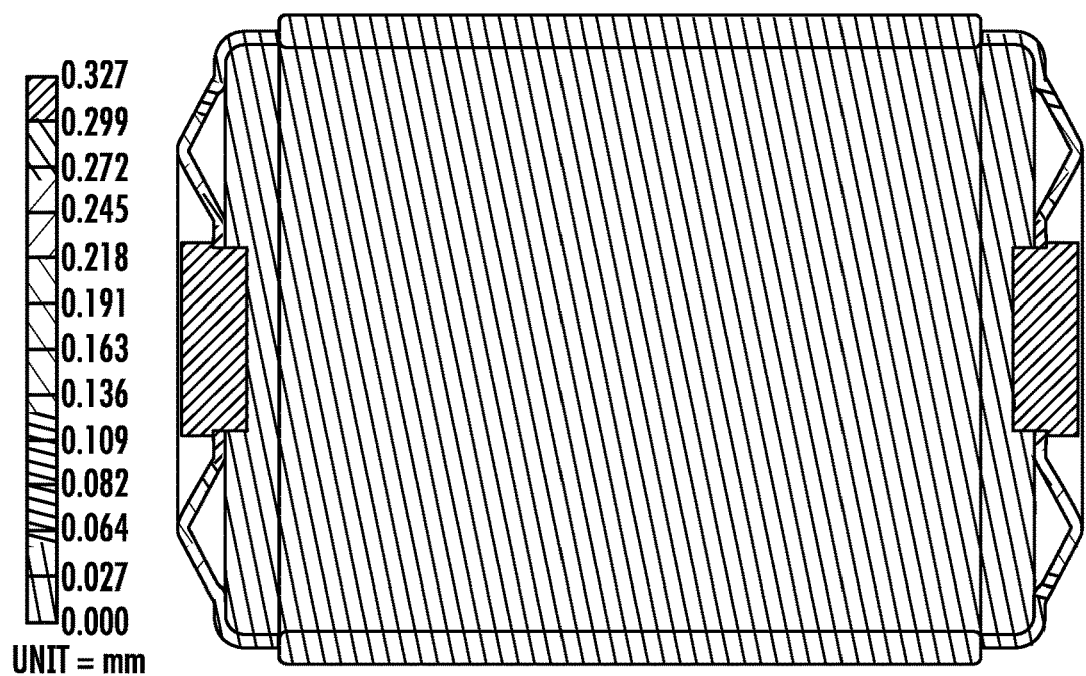
FIGS. 4(A) and 4(B) are displacement characteristic diagrams showing the structure analysis result of each of the analytic models D1 and D2.
Figure 4B:
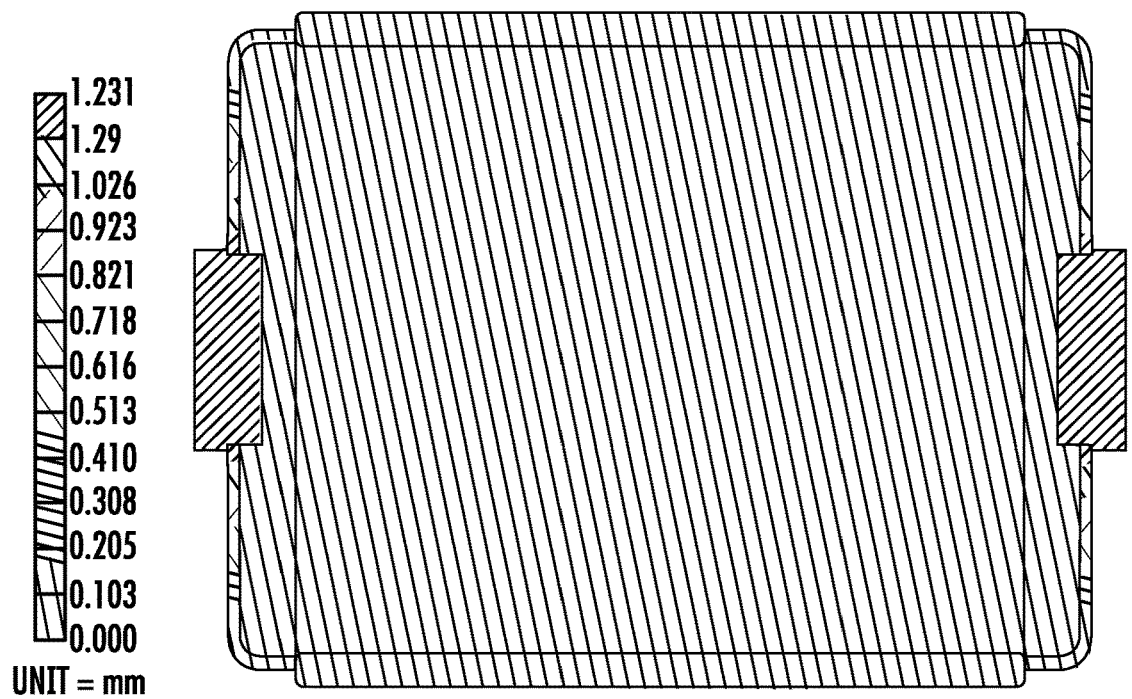

Next, a three-dimensional analytic model D1 of the vacuum interrupter 1A and a three-dimensional analytic model D2 of the vacuum interrupter 9 which were simplified into half-size symmetrical models as shown in FIG. 3(A) and FIG. 3(B) were created by CAE analysis, and structural analysis in case where a load (external pressure) was applied to each of the analytic modes D1 and D2 was conducted, and the results shown in FIG. 4(A) and FIG. 4(B) were obtained.

In addition, as a constraint condition of each of the analytic models D1 and D2, an asymmetrical model constraint condition was given to a half-size symmetrical surface, and each of the cylindrical bodies 10 and 90 has simplified structure formed by ceramic, and a complete fixed condition was given to a part thereof. In addition, the interior angle θ was set so as to satisfy 120° and the relationship between the diameters L and L1 was set so as to satisfy the relationship of L1/L=0.6

As material physical properties, since the Young's modulus and the Poisson's ratio were required, a general numerical value of oxygen-free copper was applied to each of the fixed-side flanges 11a and 91a, the movable-side flanges 11b and 91b, the fixed-side energizing shafts 12a and 92a and the movable-side energizing shafts 12b and 92b, and an actual measurement value (290 GPa) was applied to the cylindrical bodies 10 and 90.

In addition, a simplified structure as shown in FIGS. 3(A) and 3(B) was applied to the fixed-side energizing shafts 12a and 92a and the movable-side energizing shafts 12b and 92a. Further, a load was set to 1.1 MPa in consideration of the pressure difference between the inner side and the outer side of each of the vacuum containers 1 and 91.

First, according to FIG. 4(B), in the analytic model D2, the largest displacement appeared at the fixed-side energizing shaft 92a and the movable-side energizing shaft 92b and around them, and its displacement amount was 1.231 mm.

On the other hand, according to FIG. 4(A), in the analytic model D1, although, similar to the analytic model D2, the largest displacement appeared at the fixed-side energizing shaft 12a and the movable-side energizing shaft 12b and around them, its displacement amount was 0.327 mm. Therefore, as compared with the analytic model D2, in the analytic model D1, approximately 73% of a stress relaxation effect was obtained.

That is, according to the vacuum interrupter 1A, as compared with the vacuum interrupter 9, it can be understood that mechanical strength against external pressure is high. In addition, by optimizing the structure of the annular expansion portions 5a and 5b (for example, by optimizing the interior angle θ, or the area ratios of the inner peripheral side annular walls 51a and 51b and the outer peripheral side annular walls 52a and 52b), there is a possibility that the mechanical strength can be enhanced further.

<Application Example of Vacuum Interrupter>

If, in a vacuum breaker or the like, at least one vacuum interrupter 1A is accommodated inside a sealed container (in the after-mentioned FIG. 5, the grounding tank 71) which is filled with an insulation medium gas, and desired characteristics (such as insulation performance and breaking performance) can be exhibited by appropriately operating the movable-side energizing shaft 12b, various modes can be applied. Specifically, a configuration shown in FIG. 5 can be cited.

Figure 5:
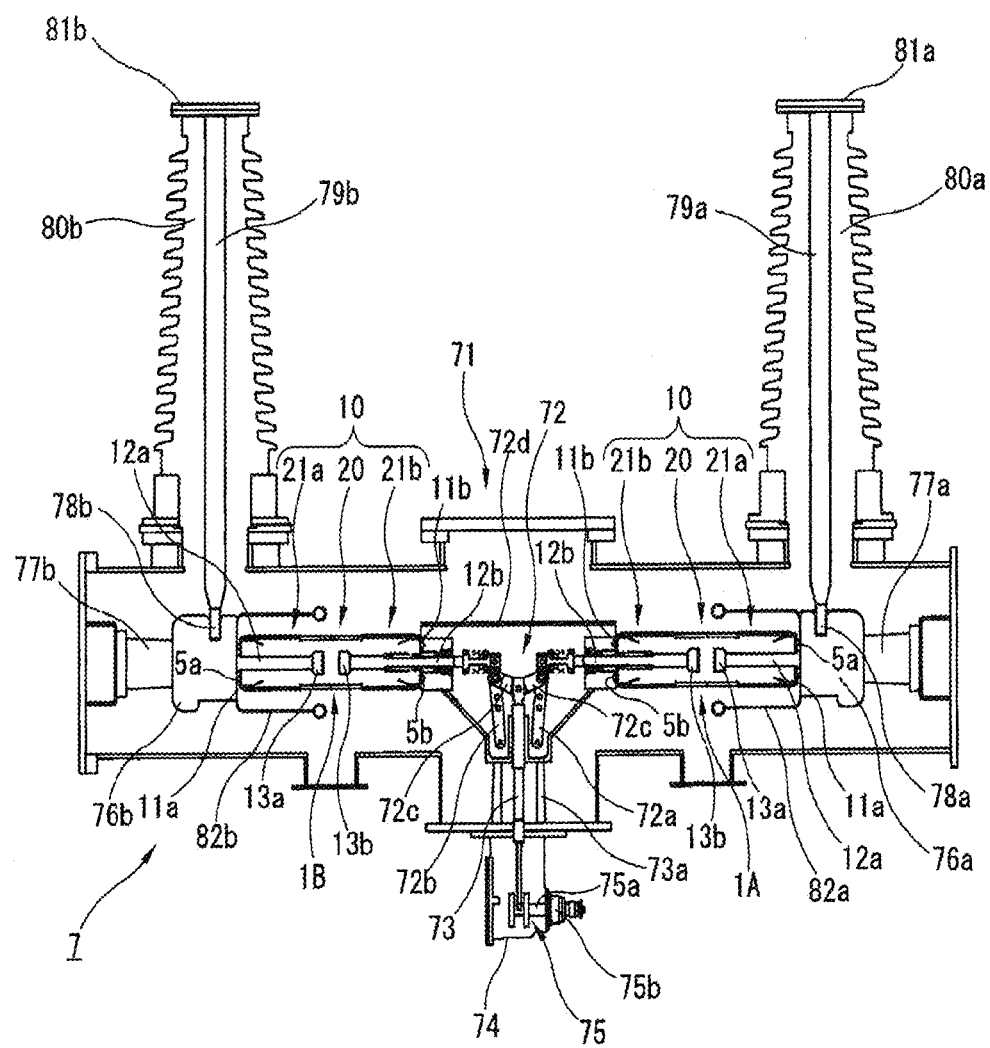
FIG. 5 is a schematic diagram for explaining a schematic configuration of a vacuum breaker 7 in an embodiment (sectional view in the axial direction (in the right and left direction in the drawing) of a grounding tank 71).

FIG. 5 is one for explaining the schematic configuration of the vacuum breaker 7 in an embodiment. In addition, the use of the same reference number designates the same components as those in FIG. 1, and redundant explanation is omitted. For example, the after-mentioned vacuum interrupter 1B has the same configuration as that of the vacuum interrupter 1A, and its detailed explanation is appropriately omitted.

The vacuum breaker 7 includes a grounding tank 71, a pair of vacuum interrupters 1A and 1B accommodated inside the grounding tank 71, and a link mechanism 72 interposed between the vacuum interrupters 1A and 1B so as to open and close the vacuum interrupters 1A and 1B.

The grounding tank 71 is one formed by using, for example, a cylindrical metal container, and has a structure which is capable of accommodating the vacuum interrupters 1A and 1B so as to be arranged on the same line in a posture in which movable-side flanges 11b of the respective vacuum interrupters 1A and 1B face each other. The inside of the grounding tank 71 is filled with, for example, an insulation medium gas (such as dry air, nitrogen gas or $SF_6$).

The link mechanism 72 includes a link 72a, a link 72b and links 72c, and is accommodated in a link mechanism case 72d. One end portion of the link 72a is rotatably supported inside the link mechanism case 72d, and the other end portion of the link 72a is supported rotatably to a movable-side energizing shaft 12b of the vacuum interrupter 1A. In addition, one end portion of the link 72c is rotatably provided to the link 72a, and the other end portion of the link 72c is rotatably supported on one end portion of an insulation operation rod 73 configured for the opening and closing operation of the vacuum interrupter 1A.

Similarly, one end portion of the link 72b is rotatably supported inside the link mechanism case 72d, and the other end portion of the link 72b is supported rotatably to a movable-side energizing shaft 12b of the vacuum interrupter 1B. In addition, one end portion of the link 72c is rotatably supported on the link 72b, and the other end portion of the link 72c is rotatably supported on one end portion of the insulation operation rod 73.

The link mechanism case 72d accommodates the link mechanism 72 so as to electrically connect the movable-side energizing shafts 12b of the respective vacuum interrupters 1A and 1B. In addition, the link mechanism case 72d is supported via a support insulating tube 73a which is interposed between the movable-side flanges 11b of the respective vacuum interrupters 1A, 1B, and is provided on the inner peripheral surface of the grounding tank 71.

The insulation operation rod 73 is provided so as to be inserted through the side portions of the link mechanism case 72d, the support insulating tube 73a and the grounding tank 71. The insertion portion of the insulation operation rod 73 which is the outer peripheral side of the grounding tank 71 is provided with an operation part 74.

The operation part 74 accommodates a converting mechanism 75, and is configured so as to convert the rotation motion of a rotation shaft 75a into the liner motion of the insulation operation rod 73 via the converting mechanism 75. One end of the rotation shaft 75a is exposed from the outer peripheral side of the operation part 74 via a rotation seal part 75b. With this, in the outside of the operation part 74, an operation mechanism (not shown) for operating the insulation operation rod 73 and an insulation operation rod (not shown) of another phrase can be driven in linkage with the rotation shaft 75a.

In the vacuum interrupter 1A, a conductor coupling part 76a electrically conducted to the fixed-side energizing shaft 12a is provided on the vacuum container 1 outer side of the fixed-side flange 11a, and is supported on the inner peripheral surface of the grounding tank 71 via a support insulator 77a. In addition, a conductor 79a is connected to the conductor coupling part 76a via a conductor metal fitting 78a.

Similar to the vacuum interrupter 1A side, in the vacuum interrupter 1B, a conductor coupling part 76b electrically conducted to the fixed-side energizing shaft 12a is provided on the vacuum container 1 outer side of the fixed-side flange 11a, and is supported on the inner peripheral surface of the grounding tank 71 via a support insulator 77b. In addition, a conductor 79b is connected to the conductor coupling part 76b via a conductor metal fitting 78b.

The conductor 79a is provided in a state of protruding from the inside of the grounding tank 71 toward the outside of the grounding tank 71, and a bushing 80a is provided in the area surrounding the conductor 79a. The bushing 80a is supported on the grounding tank 71, and the distal end portion on the protruding direction side of the bushing 80a is provided with a bushing terminal 81a electrically conducted to the conductor 79a.

Similar to the conductor 79a side, the conductor 79b is provided in a state of protruding from the inside of the grounding tank 71 toward the outside of the grounding tank 71, and a bushing 80b is provided in the area surrounding the conductor 79b. The bushing 80b is supported on the grounding tank 71, and the distal end portion on the protruding direction side of the bushing 80b is provided with a bushing terminal 81b electrically conducted to the conductor 79b.

The outer peripheral side of the fixed-side insulating portion 21a of the vacuum interrupter 1A and the outer peripheral side of the fixed-side insulating portion 21a of the vacuum interrupter 1B are respectively provided with cylindrical outer-peripheral-side sub shields 82a and 82b surrounding the outer peripheral sides of the fixed-side insulating portions 21a respectively. The outer-peripheral-side sub shield 82a is superimposed with the middle shield 20 of the vacuum interrupter 1A in the radial direction of the middle shield 20, and the outer-peripheral-side sub shield 82b is superimposed with the middle shield 20 of the vacuum interrupter 1B in the radial direction of the middle shield 20.

In the input operation of the vacuum breaker 7 in FIG. 5, based on, for example, a desired input command, it is performed by the movement of the insulation operation rod 73 toward the inside direction (upper direction in FIG. 5) of the grounding tank 71 by a driving mechanism not shown (for example, a driving mechanism connected to the insulation operation rod 73). That is, the link 72c connected to the link 72a moves while rotating (in FIG. 5, rising while rotating right) in accordance with the movement of the insulation operation rod 73. In accordance with this movement of the link 72c, the link 72a moves the movable-side energizing shaft 12b of the vacuum interrupter 1A toward the fixed electrode 13a side along the axial direction. Consequently, the fixed electrode 13a and the movable electrode 13b of the vacuum interrupter 1A are electrically connected to each other.

Similarly, the link 72c connected to the link 72b moves while rotating (in FIG. 5, rising while rotating left) in accordance with the movement of the insulation operation rod 73. In accordance with this movement of the link 72c, the link 72b moves the movable-side energizing shaft 12b of the vacuum interrupter 1B toward the fixed electrode 13a side along the axial direction. Consequently, the fixed electrode 13a and the movable electrode 13b of the vacuum interrupter 1B are electrically connected to each other.

On the other hand, a cutoff operation is performed by the movement of the insulation operation rod 73 toward the outside direction of the grounding tank 71 (lower direction in FIG. 5). That is, by the operation reverse to the input operation, the movable-side energizing shaft 12b of the vacuum interrupter 1A moves in the direction separating from the vacuum interrupter 1A along the axial direction, and the movable electrode 13b separates from the fixed electrode 13a of the vacuum interrupter 1A.

Similarly, the movable-side energizing shaft 12b of the vacuum interrupter 1B moves in the direction separating from the vacuum interrupter 1B along the axial direction, and the movable electrode 13b separates from the fixed electrode 13a of the vacuum interrupter 1B.

In each of the vacuum interrupters 1A and 1B, in case of performing such an input operation and a cutoff operation mentioned above, even if the movable-side energizing shaft 12b moves, the vacuum state inside the vacuum container 1 is maintained by the extensible bellows 14. The bellows 14 of each of the vacuum interrupters 1A and 1B is one which is capable of withstanding the differential pressure between the vacuum on the outer peripheral side and an insulation medium gas on the inner peripheral side to a certain extent.

According to such a configuration shown in FIG. 5, in the vacuum interrupters 1A and 1B accommodated in the grounding tank 71, mechanical strength which is capable of withstanding the external pressure can be obtained, and, for example, the pressure of the insulation medium gas inside the grounding tank 71 can be increased.

For example, an insulation medium gas (for example, dry air) was filled in the grounding tank 71, the pressure inside the grounding tank 71 was set to a pressure higher than 0.9 MPa, and the vacuum breaker 7 of which the rated voltage was 154 kV was configured and operated. Consequently, it was confirmed that a desired characteristic was exhibited.

As the above, although only the described embodiment of the present invention has been explained in detail, it is obvious by a skilled person in the art that various modifications and the like can be made to the disclosed embodiment without departing from the scope and spirit of the present invention, and it is obvious that such a modification and the like belong to the scope of the claims.

The invention claimed is:

1. A vacuum interrupter comprising:
a vacuum container including an insulating cylindrical body, the vacuum container being sealed with a fixed-side flange on a fixed side thereof which is one end side in an axial direction of the cylindrical body, and being sealed with a movable-side flange on a movable side thereof which is an other end side in the axial direction;
a fixed-side energizing shaft extending in a vacuum container inner side direction of the axial direction, in a fixed-side flange middle portion;
a fixed electrode supported on an end portion on an extending direction side of the fixed-side energizing shaft;
a movable-side energizing shaft which extends in the axial direction while passing through a movable-side flange middle portion in the axial direction, and is supported on a vacuum container inner side of the movable-side flange via a bellows which is extensible in the axial direction, so as to be movable in the axial direction; and
a movable electrode which is supported on an end portion on the vacuum container inner side of the movable-side energizing shaft so as to face the fixed electrode, and comes in contact with and separates from the fixed electrode in accordance with a movement of the movable-side energizing shaft,
wherein the fixed-side flange is formed with an annular expansion portion between the flange middle portion and a flange outer peripheral edge portion of the fixed-side flange and the movable-side flange is formed with an annular expansion portion between the flange middle portion and a flange outer peripheral edge portion of the movable-side flange, and each of the annular expansion portions is formed in an annular shape extending along an outer periphery of a corresponding one of the flange middle portions, and is formed in a shape expanding in an vacuum container outer side direction of the axial direction, and
wherein each of the expansion portions includes:
an inner peripheral side annular wall which is positioned from a corresponding one of distal end portions in an expanding direction of a corresponding one of the expansion portions toward a corresponding one of the flange middle portions, and has a shape of which a diameter increases as a distance to the corresponding one of the distal end portions decreases; and
an outer peripheral side annular wall which is positioned from a corresponding one of the distal end portions in the expanding direction of a corresponding one of the expansion portions toward a corresponding one of the flange outer peripheral edge portions, and has a shape of which a diameter decreases as a distance to the corresponding one of the distal end portions decreases.

2. The vacuum interrupter according to claim 1, wherein an interior angle $\theta$ of each of the expansion portions between a corresponding one of the inner peripheral side annular walls and a corresponding one of the outer peripheral side annular walls is in a range of 90°-150°.

3. The vacuum interrupter according to claim 1, wherein when a diameter of each of the distal end portions in the expanding direction is referred to as L1 and a diameter of each of the flange outer peripheral edge portions is referred to as L, a relationship therebetween satisfies a relational expression of $0.5L \leq L1 \leq 0.7L$.

4. A vacuum breaker provided with at least one vacuum interrupter according to claim 1, comprising:
a sealed container which accommodates the vacuum interrupter, and is filled with an insulation medium gas inside thereof;
a link mechanism which is disposed inside the sealed container, and is configured to electrically connect the movable-side energizing shaft of the vacuum interrupter so as to be movable in the axial direction; and
an operation part which is disposed on an outer peripheral side of the sealed container, and is configured to operate the link mechanism via an insulation operation rod connected to the link mechanism.

* * * * *